No. 652,790. Patented July 3, 1900.
V. LETO.
AUTOMATIC INDICATOR.
(Application filed Aug. 21, 1899.)
(No Model.)
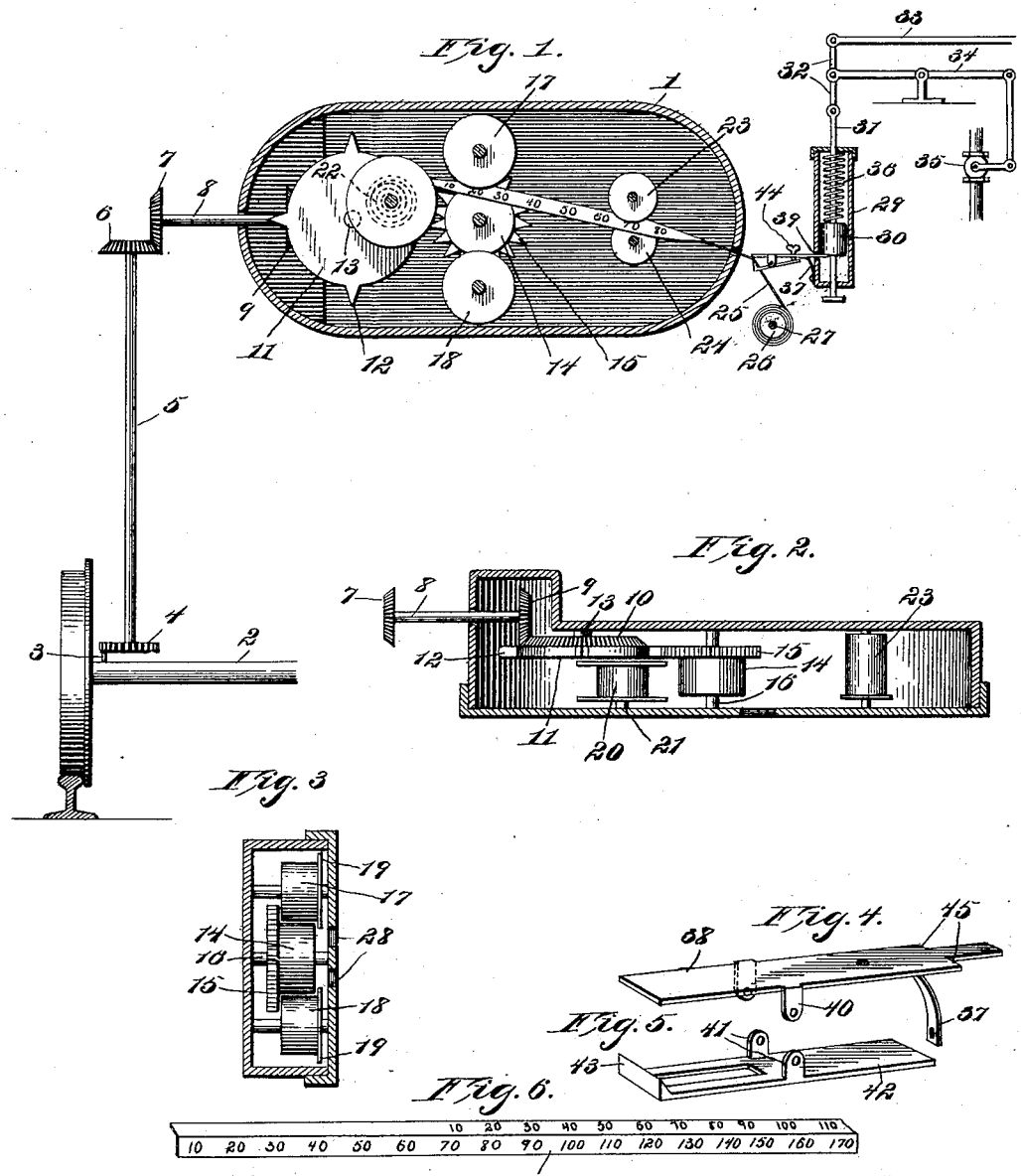
WITNESSES
Louis D. Heinrichs
F. D. McCleary
INVENTOR
Vito Leto
By Victor J. Evans
Attorney

UNITED STATES PATENT OFFICE.

VITO LETO, OF NEWARK, NEW JERSEY.

AUTOMATIC INDICATOR.

SPECIFICATION forming part of Letters Patent No. 652,790, dated July 3, 1900.

Application filed August 21, 1899. Serial No. 727,977. (No model.)

*To all whom it may concern:*

Be it known that I, VITO LETO, a subject of the King of Italy, residing at Newark, in the county of Essex and State of New Jersey, have invented certain new and useful Improvements in Automatic Indicators for Locomotives, of which the following is a specification.

My invention relates to indicators and signal mechanism for railway-locomotives, and its objects are to automatically indicate to the engineer the distance traveled and to automatically operate a signal and simultaneously cut off the supply of steam from the locomotive when a predetermined distance has been traveled.

It is important that the engineer should know at all times at what point on the road his train is traveling, so that the proper stops may be made, signals given, &c. Ordinarily an engineer familiar with his route experiences no difficulty in this respect in day-time or in good clear weather at night; but in foggy weather or at other times when for any reason the usual landmarks are not visible and the engineer depends entirely upon his timepiece an indicator for accurately noting the distance traveled is an important accessory as a safeguard to the traveling public. Again, when the engineer is under orders to stop at a given point or station at a known distance away it is highly important that no mistake should be made and that means be provided for guarding against error on the part of the engineer. The present invention aims to accomplish these results, and its construction and novel features will be fully described hereinafter and defined in the appended claims in connection with the accompanying drawings, which form a part of this specification, and in which—

Figure 1 is an elevation, partly in section, of an apparatus embodying the invention and showing means for operating it from the axle of the locomotive. Fig. 2 is a top plan view of the indicator, partly in section. Fig. 3 is a vertical sectional view, and Figs. 4, 5, and 6 illustrate parts in detail.

The reference-numeral 1 indicates a casing which may be of any suitable or convenient shape to contain parts of the mechanism and is designed to be located in the cab of a locomotive.

From one of the axles 2 of the locomotive projects a pin 3, which is adapted at each revolution to strike one of the teeth of a sprocket-wheel 4, mounted upon the lower end of a vertical shaft 5, which is supported in suitable bearings upon the framework of the locomotive. At the upper end of the shaft 5 is mounted a bevel gear-wheel 6, adapted to mesh with a corresponding bevel-gear 7, mounted upon the end of a horizontal shaft 8, supported in any suitable bearings within the casing 1. The inner end of the shaft 8 is provided with a bevel gear-wheel 9, which meshes with a bevel-gear 10, which is concentric with and preferably a part of a wheel 11, provided with equidistant spur-teeth 12 and mounted upon a shaft 13 within the casing.

14 designates a roller provided at one end with a series of teeth 15, adapted to be struck by the teeth of the wheel 11. This roller 14 is mounted upon a shaft 16, and located, respectively, above and below said roller 14 are the rollers 17 and 18, each formed with an annular flange 19 to overlap the peripheral edge of the roller 14 for a purpose hereinafter described. Between the wheel 11 and roller 14 is interposed a winding-roller 20, mounted revolubly upon a pin or stud 21, projecting from the front of the casing and adapted to be revolved by a spring 22. (Shown in dotted lines in Fig. 1.)

23 and 24 are guide-rollers through which passes a ribbon 25 from a delivery-roll 26, supported outside of the casing, but adjacent thereto, upon a shaft 27. The ribbon 25, which is shown in detail in Fig. 6, is provided with two rows of numbers, representing miles by multiples of ten. The specific arrangement of these numbers is of course not essential, as they may represent yards, furlongs, miles, or other subdivisions of distance with relation to the travel of the locomotive. The lower series of numbers begins at the end of the ribbon, while the upper series begins at a distance from the end for a purpose to be explained hereinafter. After passing through the guide-rollers 23 and 24 the ribbon passes between the roller 14 and the upper flanged roller 17 and from thence to the winding-roller 20. As the ribbon passes between the rollers 14 and 17 the flange 19 of the latter folds the projecting edge of the ribbon down, as illustrated in Fig. 1, so that the lower series of numbers will be exposed through an opening 28, formed in the front of the casing and preferably covered by a glass.

At the right of the casing 1, adjacent to the delivery-roller 26, is supported a vertically-disposed cylinder 29, within which is arranged a plunger 30, through which extends a rod 31. The lower end of the rod 31 extends through the lower end of the cylinder 29 and is provided with a knob or handle. The top of the cylinder 29 is formed with an opening for the passage of the upper end of the rod 31, which is connected by link 32 with two parallel levers 33 and 34, the former being adapted to control the steam-whistle of the locomotive and the latter being connected to a valve 35 for cutting off the supply of steam to the engine. Within the cylinder 29, between the top thereof and the upper end of the plunger 30, a coil-spring 36 surrounds the rod 31.

To provide for so securing the ribbon that it will cause an alarm and cut off steam when the locomotive has traveled a predetermined distance, a spring 37 is secured at one end to the lower end of the cylinder, and to the upper end of said spring is attached a slide 38, the inner end of which is adapted to enter an opening 39 in the side of the cylinder. The slide 38 is formed with depending lugs 40, to which are pivotally secured lugs 41, projecting from a plate 42, the latter being formed at its outer end with a lip 43 for clamping the ribbon against the slide 38. A thumb-screw 44 passes through an opening in the slide 38 to bear against the inner end of the plate 42 and force the outer end of the latter into clamping contact with the slide. To limit the inward movement of the slide 38, its inner end is recessed to form shoulders 45, which abut against the outer surface of the cylinder.

The operation of the mechanism may be described as follows: Each revolution of the axle causes its pin 3 to strike one tooth of the sprocket-wheel 4, thus revolving the latter and its shaft 5, and through the bevel-gearing described giving a partial revolution to the wheel 11. The contact of the teeth of this wheel 11 with the teeth of the roller 14 revolves said roller to advance the ribbon toward the winding-roller 20, the spring of the roller 20 causing it to revolve to take up the slack of the ribbon. It will be understood that the distance traveled at each revolution of the axle will be predetermined and such distance taken as the unit of measurement for the indicator, and the wheel 11 and toothed roller 14 will be so proportioned that a given number of revolutions of the axle will so advance the ribbon that it will accurately indicate the actual distance traveled, the figures representing such distance being visible through the opening or window of the casing. When it is desired to set the device to signal and cut off steam after a given distance is traveled, the engineer pushes the plunger 30 upward to the position shown in Fig. 1, where it is held by the inner end of the slide, and reels the ribbon off of the delivery-roll 26 until the figure representing the distance is reached, when the ribbon at that point is clamped between the slide 38 and plate 42. The slack of the ribbon thus reeled off will hang down between the roller 26 and the casing, and when the travel of the locomotive has wound up all of this slack the continued winding and pull up in the ribbon (caused by the arrival of the train at the predetermined distance) will pull the slide 38 outward, thus releasing the plunger, which is immediately forced down under the pressure of its spring 36. The first numeral "10" of the lower row of figures is placed at a sufficient distance from the end of the ribbon to bring that numeral opposite the window-opening in the casing when the train has traveled a distance indicated by the numeral. The first numeral "10" of the upper row of figures is placed a distance from the end of the ribbon equal to the distance from the window-opening in the casing to the device for clamping the ribbon, so that when the "10" of the lower row of figures appears at the window the "10" of the upper row will be opposite the clamping-lip 43. This arrangement insures the proper correspondence between the indicators at the two points referred to. For example, if the engineer is under orders to stop at a station one hundred miles distant from the starting-point he reels the ribbon off of the roller 26 until the number "100" of the upper row of figures appears opposite the clamping-lip 43, where the latter is engaged with the ribbon. After the train has traveled the hundred miles the signal will be operated and the number "100" of the lower row of figures will appear at the indicator-window. When the locomotive is run backward, the ribbon is removed from between the rollers 14 and 17 and placed between the lower slide of the roller 14 and the roller 18, in which position it will wind upon the winding-roller as before.

To avoid a stoppage of the indicating mechanism by the slipping of the wheel of the locomotive upon the rail, the rail may be formed on its inner side with depressions and the sprocket-wheel of the indicator arranged to be operated therefrom, so that the operation of the indicator mechanism will be independent of the wheel. Instead of the sprocket-wheel a friction-wheel with a yielding tire might be employed to contact with the side of the rail.

Various other changes and modifications in the details of the mechanism may be resorted to without departing from the spirit of the invention, and hence I would have it understood that the invention includes all forms or constructions which fall within the scope of the following claims.

I claim—

1. An indicator for locomotives comprising a ribbon provided with two rows of indicating-figures; a delivery-roll; a receiving-roll; means for driving said rolls by the travel of the locomotive and means for automatically folding the ribbon as it passes to the receiving-roll.

2. An indicator for locomotives comprising a shaft operated by the travel of the locomotive; a toothed wheel geared to said shaft; a roller provided with teeth and adapted to be driven by the toothed wheel; an indicating-ribbon provided with two rows of indicating-figures, said rows commencing at different distances from the end of the ribbon; a delivery-roll; a receiving-roll; and guide-rollers.

3. The combination with an indicator of a movable ribbon provided with two rows of indicating-figures, said rows commencing at different distances from the end of the ribbon; means for simultaneously operating a signal and valve, comprising a cylinder; a spring-pressed plunger; levers for operating the signal and valve; and a catch or clamp for engaging the ribbon and controlling the movement of the plunger.

4. The combination with a casing and indicator mechanism therein; of means for operating the latter by the travel of a locomotive; a traveling ribbon provided with two rows of indicating-figures, said rows commencing at different distances from the end of the ribbon, and means for folding the ribbon consisting of a flanged roller coöperating with a plain-faced roller.

In testimony whereof I affix my signature in presence of two witnesses.

VITO LETO.

Witnesses:
WM. L. FORD,
F. MONRO.